United States Patent [19]

Cutler et al.

[11] Patent Number: 5,317,717

[45] Date of Patent: May 31, 1994

[54] APPARATUS AND METHOD FOR MAIN MEMORY UNIT PROTECTION USING ACCESS AND FAULT LOGIC SIGNALS

[75] Inventors: David N. Cutler, Bellevue; David A. Orbits, Redmond, both of Wash.; Dileep Bhandarkar, Shrewsbury, Mass.; Wayne Cardoza, Merrimack, N.H.; Richard T. Witek, Littleton, Mass.

[73] Assignee: Digital Equipment Corp., Maynard, Mass.

[21] Appl. No.: 932,913

[22] Filed: Aug. 20, 1992

Related U.S. Application Data

[63] Continuation of Ser. No. 471,055, Jan. 23, 1990, abandoned, which is a continuation of Ser. No. 69,290, Jul. 1, 1987, abandoned.

[51] Int. Cl.⁵ .............................. G06F 12/14
[52] U.S. Cl. ........................ 395/425; 364/DIG. 1
[58] Field of Search .......... 364/200 MS:90 MS; 395/400 MS, 425 MS

[56] References Cited

U.S. PATENT DOCUMENTS

| | | | |
|---|---|---|---|
| 3,573,855 | 4/1971 | Cragon et al. | 395/425 |
| 3,675,215 | 7/1972 | Arnold et al. | 395/425 |
| 3,764,996 | 10/1973 | Ross | 364/200 |
| 3,825,904 | 7/1974 | Burk et al. | 364/200 |
| 3,976,978 | 8/1976 | Patterson et al. | 364/200 |
| 4,038,645 | 7/1977 | Birney et al. | 395/425 |
| 4,047,244 | 9/1977 | Finkemeyer et al. | 364/200 |
| 4,051,461 | 9/1977 | Hashimoto et al. | 364/200 |
| 4,130,870 | 12/1978 | Schneider | 364/200 |
| 4,162,529 | 7/1979 | Suzuki et al. | 364/200 |
| 4,228,496 | 10/1980 | Katzman et al. | 364/200 |
| 4,241,401 | 12/1980 | De Ward et al. | 364/200 |
| 4,280,176 | 7/1981 | Tan | 364/200 |
| 4,300,192 | 11/1981 | Couleur et al. | 364/200 |
| 4,328,542 | 5/1982 | Anastas et al. | 364/200 |
| 4,356,550 | 10/1982 | Katzman et al. | 364/200 |
| 4,366,537 | 12/1982 | Heller et al. | 364/200 |
| 4,383,296 | 5/1983 | Sander | 364/200 |
| 4,385,352 | 5/1983 | Bienvenu | 364/200 |
| 4,394,725 | 7/1983 | Bienvenu et al. | 364/200 |
| 4,439,830 | 3/1984 | Chueh | 364/200 |
| 4,442,484 | 4/1984 | Childs, Jr. et al. | 364/200 |
| 4,466,056 | 8/1984 | Tanahashi | 364/200 |
| 4,481,573 | 11/1984 | Fukunaga et al. | 364/200 |
| 4,513,367 | 4/1985 | Chan et al. | 364/200 |
| 4,638,426 | 1/1987 | Chang et al. | 364/200 |
| 4,731,739 | 3/1988 | Woffinden et al. | 364/200 |
| 4,797,814 | 1/1989 | Brenza | 364/200 |
| 4,851,991 | 7/1989 | Rubinfeld et al. | 364/200 |
| 4,884,197 | 11/1989 | Sachs et al. | 364/200 |

FOREIGN PATENT DOCUMENTS 1200919 2/1986 Canada.

OTHER PUBLICATIONS

Deitel, *An Introduction to O.S.*, pp. 198–208, Southeast Book Co.

Primary Examiner—Joseph L. Dixon
Assistant Examiner—Reba I. Elmore
Attorney, Agent, or Firm—Fish & Richardson

[57] ABSTRACT

In a data processing system, apparatus and method for controlling the type of processing to which data signal groups can be subjected includes a page table entry format having a multiplicity of field positions for storing signals defining page access rights. In addition to the read/write access control, the signal group access rights can be determined by the current mode of operation of the data processing unit and the intended activity of the addressed instruction or data element (i.e., read, write or execute).

20 Claims, 5 Drawing Sheets

… … 1

APPARATUS AND METHOD FOR MAIN MEMORY UNIT PROTECTION USING ACCESS AND FAULT LOGIC SIGNALS

This is a continuation of application Ser. No. 07/471,055, filed Jan. 23, 1990, now abandoned, which is a continuation of Ser. No. 07/069,290, filed Jul. 1, 1987, now abandoned.

RELATED APPLICATIONS

This application is related to the following U.S. Patent Applications.

APPARATUS AND METHOD FOR RECOVERING FROM MISSING PAGE FAULTS IN VECTOR DATA PROCESSING OPERATIONS invented by David N. Cutler, David A. Orbits, Dileep Bhandarkar, Wayne Cardoza and Richard T. Witek; having Ser. No. 07/463,002; filed on Jul. 1, 1987 and assigned to the assignee of the present U.S. Patent Application.

APPARATUS AND METHOD FOR PROVIDING AN EXTENDED PROCESSING ENVIRONMENT FOR NONMICROCODED DATA PROCESSING SYSTEMS invented by David N. Cutler, David A. Orbits, Dileep Bhandarkar, Wayne Cardoza and Richard T. Witek; having Ser. No. 07/551,040; filed on Jul. 14, 1987 and assigned to the assignee of the present U.S. Patent Application.

APPARATUS AND METHOD FOR SYNCHRONIZATION OF ACCESS TO MAIN MEMORY SIGNAL GROUPS IN A MULTIPROCESSING UNIT DATA PROCESSING SYSTEM invented by David N. Cutler, David A. Orbits, Dileep Bhandarkar, Wayne Cardoza and Richard T. Witek; having Ser. No. 07/069,372; filed on Jul. 1, 1987 and assigned to the assignee of the present U.S. Patent Application.

BACKGROUND OF THE INVENTION

1. Field of the Invention

This invention relates generally to data processing systems and, more particularly, to the control of the instruction and data elements that are processed by the data processing system.

2. Description of the Related Art

In data processing systems, the data elements that are manipulated by the data processing system, as well as instruction elements forming a program controlling the manipulations, are typically stored in a main memory unit. The main memory unit can store instruction and data elements associated with a multiplicity of programs being executed by the data processing system. For a variety of reasons, such as integrity of the instruction and data elements, it is frequently desirable to control the type of manipulation to which the instruction and data elements can be subjected. For example, inconsistent results can occur when a user of the data processing system can cause the fundamental portions of the operating system program or selected subroutines to be altered.

In the past, a variety of techniques have been used to control the type of manipulation to which a logic signal group can be subjected. A field (or fields) can be associated with each logic signal group that designates the intended use of the associated instruction or data element. Because of the variety of access rights that can be assigned to the instruction or data element, only a subset of all possible access rights to the associated instruction or data elements can be assigned without the requisite access rights fields becoming excessively large. This problem is addressed in a somewhat different manner by the Multics (Multiplexed Information and Computing Service) system in which a multiplicity of privilege levels are defined for the operation of the data processing system and transfer between these levels is rigidly controlled. The Multics system is described in "The Multics System; An Examination of its Structure" by Elliott I. Orgnick, published by MIT Press. The Multics system and similar data processing systems require elaborate hardware/software privilege level interfaces that typically involve a large amount of processing time to implement. Access rights associated with Multics system are defined for each level of privilege and must be examined for consistency when passing between privilege levels.

A need has therefore been felt for a technique for controlling the manipulation of instruction and data elements that has sufficient flexibility to provide for the available processing options without requiring a large amount of dedicated processing capability or, without requiring relatively large access rights fields to be associated with each instruction or data element.

FEATURES OF THE INVENTION

It is an object of the present invention to provide an improved data processing unit.

It is a feature of the present invention to control the type of manipulation to which program instruction and data elements can be subjected.

It is a more particular feature of the present invention to provide control of the access rights to instruction or data elements by storing access rights signals in the page table entry.

It is another particular feature of the present invention to make the read/write access to the data processing system memory a function of the mode of operation of the data processing system.

It is yet another particular feature of the present invention to limit the usage of an instruction element to an "execute only" usage.

It is still another particular feature of the present invention to prohibit the data processing unit from attempting to execute data (i.e., non-instruction) fields.

It is yet another feature of the present invention to provide a mechanism for signaling when a valid "read", "write" or "execute" operation is being attempted.

SUMMARY OF THE INVENTION

The aforementioned and other features are accomplished, according to the present invention, by providing apparatus for accessing page table entry fields, when the central processing unit attempts to access data in the associated page, that define the processing that can be performed on the instruction and data elements comprising the page of information. The page table entry access rights fields include enable signals for read and write operations in a user mode of operation (wherein nonprivileged instructions can be executed) and enable signals for read and write operations by a kernel mode of operation (wherein privileged and nonprivileged instructions can be executed). In addition, the page table entry access rights fields permit fault on execute, fault on write, and fault on read signals to be specified. These signals permit an instruction element to be designated as an execute only field, a data element to be designated as no-execute, and provide a means for collecting access and modify information.

These and other features of the present invention will be understood upon reading of the following description along with the drawings.

DESCRIPTION OF THE PREFERRED EMBODIMENT

1. Detailed Description of the Figures

Figure 1A:
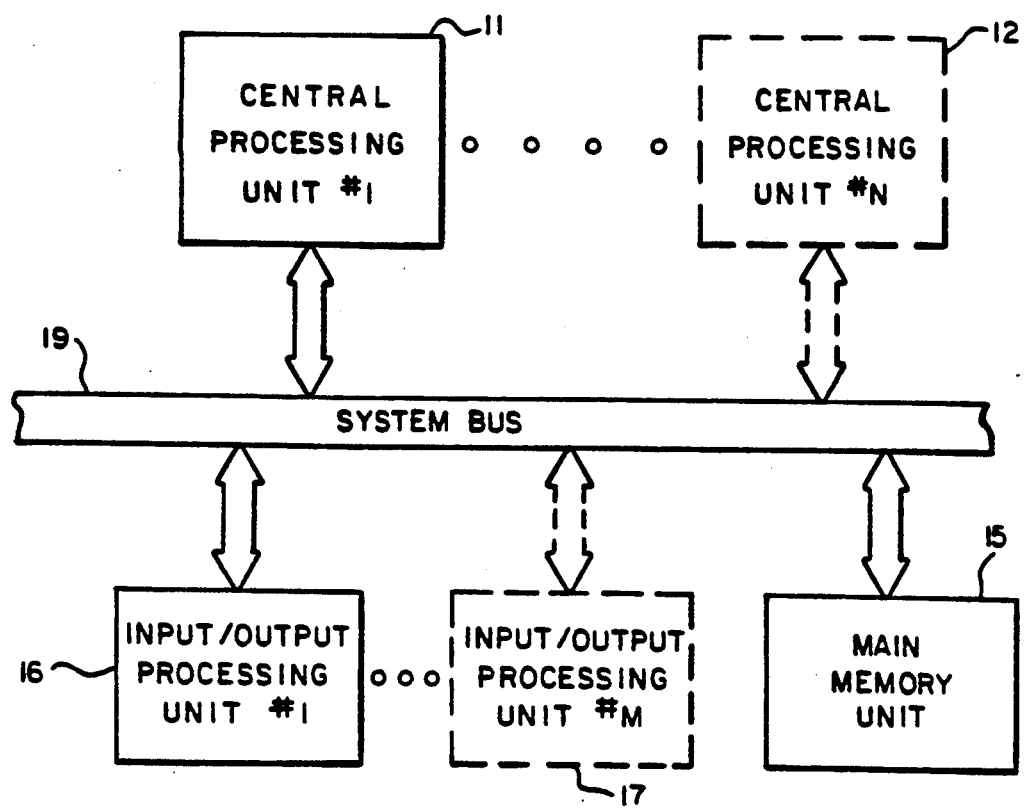
FIG. 1A and FIG. 1B are examples of data processing system implementations capable of using the present invention.
Figure 1B:
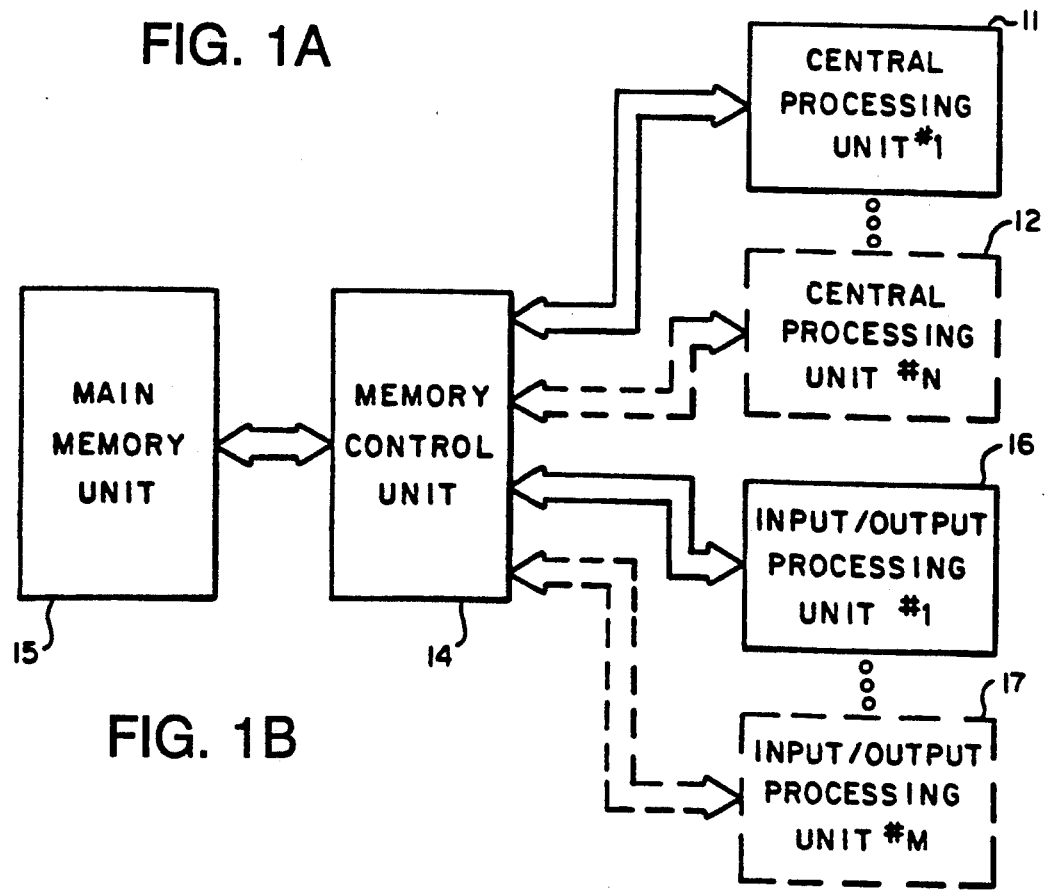

Referring now to FIG. 1A and FIG. 1B, two exemplary data processing system configurations capable of using the present invention are shown. In FIG. 1A, the central processing unit (#1) 11 is coupled to a system bus 19. Other central processing units (e.g., #N) 12 can also be coupled to the system. The central processing unit(s) 11 (through 12) process data according to the structure of the central processing unit(s) in conjunction with central processing unit control programs, the control programs being comprised of instructions resident in the main memory unit 15. The nonresident data and instructions are typically stored in the mass storage unit(s) and are transferred to and from the main memory unit 15 via the system bus 19. Input/output unit(s) {#1} 16 (through {#M} 17) couple devices such as mass memory storage units, user terminal devices and communication devices to the data processing system by means of the system bus 19. The mass storage units store the data and instructions required by the data processing unit(s). Sets of data and/or instructions, typically designated as pages of data and/or instructions, required for the operation of the central processing units 11 through 12, are transferred from the mass storage units, having relatively slow accessibility, to the main memory unit to which access by the central processing unit is relatively fast. The bus oriented system has an advantage in the relative ease to reconfigure the system but has the disadvantage that each system component requires control apparatus to provide an interface with the system bus. Referring next to FIG. 1B, a data processing system is shown in which the central processing unit(s) 11 (through 12) and the input/output unit(s) 16 (through 17) are coupled to the main memory unit 15 through a memory control unit 14, the memory control unit 14 replacing the system bus 19 and the control function performed by individual data processing system components in the bus oriented data processing configuration shown in FIG. 1A. The memory control unit 14 provides a centralized control and monitoring of the transfer of data and instructions that can be more efficient than the bus oriented configuration of FIG. 1A but with the loss of flexibility.

Figure 2:
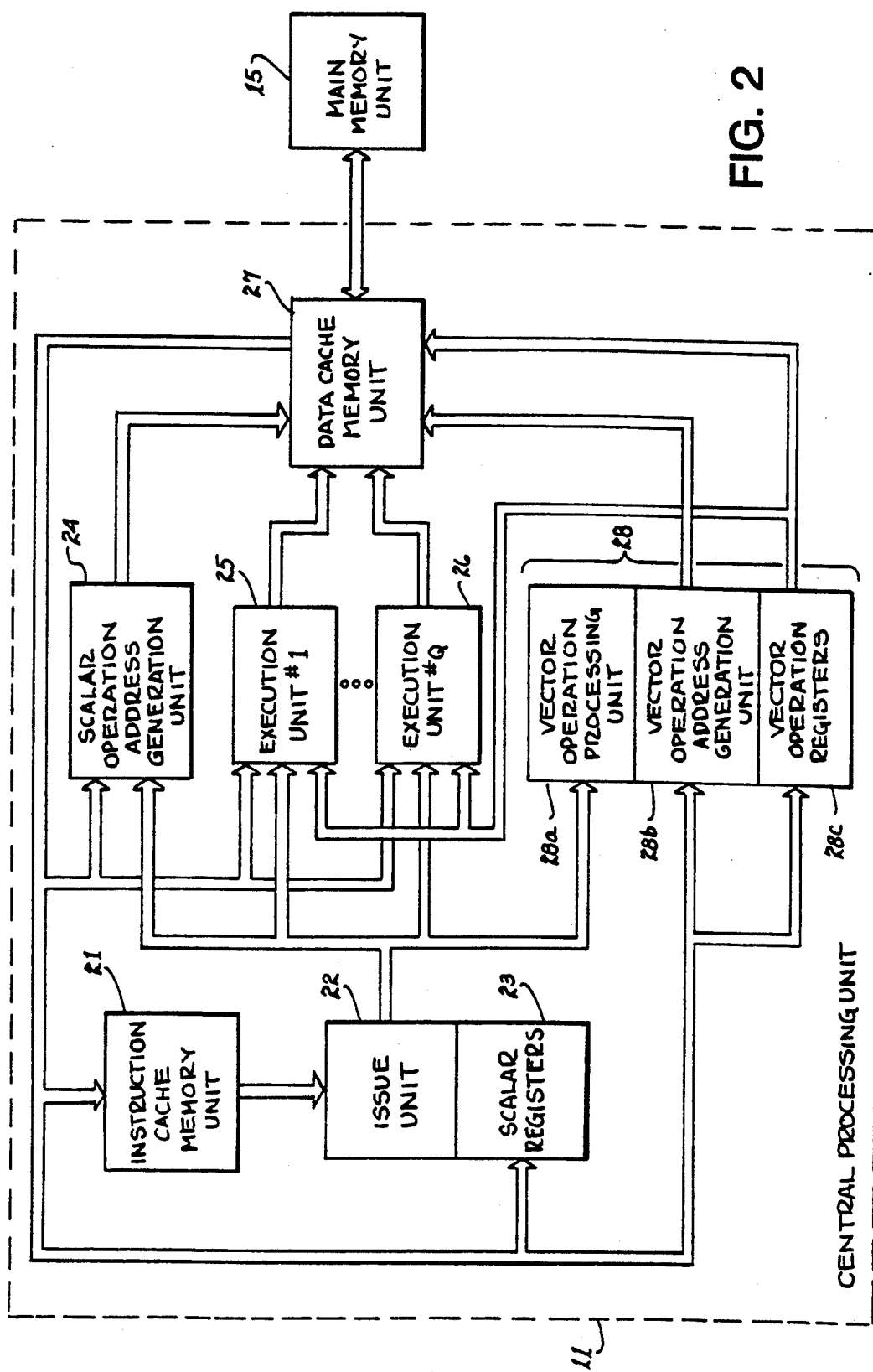
FIG. 2 is an example of a central processing unit of a data processing unit capable of using the present invention.

Referring next to FIG. 2, a block diagram of an exemplary central processing unit capable of effective utilization of the present invention is illustrated. The issue unit 22 is responsible for for providing (decoded) instructions to the plurality of specialized execution units comprising scalar operation address generation unit 24, at least one execution unit (#1) 25 (through execution unit {#Q} 26) and a vector operation unit 28, the vector operation unit 28 including vector operation processing unit 28A, vector operation address generation unit 28B and vector operation registers 28C. The data processed by the execution units are typically extracted from the scalar registers 23 or the vector registers 28C. The resulting data from the execution units are stored in the scaler registers 23, in the vector registers 28C or in the data cache memory unit 27. The data cache memory unit 27 can be viewed as a cache memory unit providing an interface between the main memory unit 15 and the central processing unit 11. (The data cache memory unit 27 is shown as being coupled directly to the main memory unit in FIG. 2. As illustrated in FIG. 1A and FIG. 1B, the actual coupling can include intervening data processing apparatus.) The issue unit 22 includes apparatus for determining which execution unit will process selected data and for determining when the selected execution unit is available for processing data. This latter feature includes ascertaining that the destination storage location will be available to store the processed data. The instruction cache memory unit 21 stores the instructions that are decoded and forwarded to the appropriate execution unit by the issue unit. The issue unit 22 has the apparatus to attempt to maximize the processing operations of the execution units. Thus, the issue unit 22 includes prefetch apparatus and algorithms to ensure that the appropriate instruction (including any branch instruction) is available to the issue unit 22 as needed. The plurality of execution units are, as indicated by the scaler operation address generation unit 24 and the vector operation unit 28, specialized processing devices for handling certain classes of processing operation. For example, an execution unit can be configured to handle floating point operations, integer arithmetic operations, etc. The issue unit 22 has associated therewith scalar registers 23 that can store data required for the execution of the program or for providing a record of the data processing operation. For example, one register is the Program Counter register that stores the (virtual) address of the next instruction, in the executing program instruction sequence, to be processed. The scalar operation address generation unit 24 is used to convert virtual addresses to physical locations in the main memory unit 15. The issue unit 22 is also responsible for reordering the data from the execution units in the correct sequence when the execution units process instructions at different rates.

The vector operation unit 28 includes a vector operation processing unit 28A, a vector operation address generation unit 28B, and vector operation registers 28C. The activity of the vector operation processing unit can control the distribution of the data to the execution units 24 through 26 and the execution of the instructions therein. According to another embodiment (not shown), execution units dedicated to execution of instructions by the vector operation unit 28 can be available in the data processing system. When the execution units are available for both vector and scalar operations, control is subject to the overall system control of the issue unit 22 that allocates the resources of the data processing unit.

Figure 3:
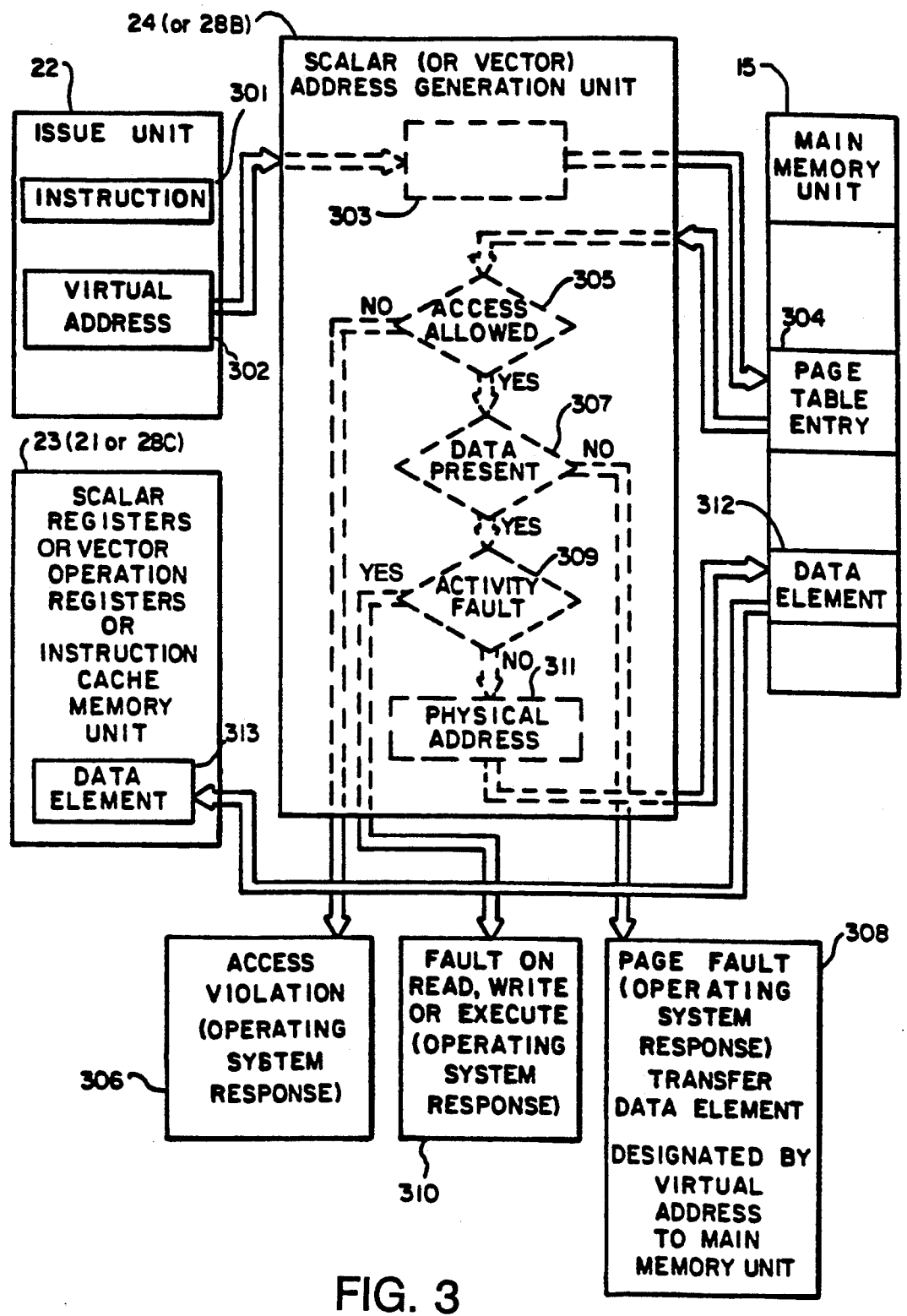
FIG. 3 is an illustration of a virtual memory data processing system organization.

Referring next to FIG. 3, a description of the virtual addressing mechanism of the preferred embodiment is illustrated. An instruction 301 in the issue unit has associated therewith a virtual address 302 identifying the data element upon which the operation of the instruction is to be performed. The issue unit transfers the virtual address 302 to scalar address generation unit 24 (or, where appropriate, the vector address generation unit 28B). In the address generation unit 24 (or 28B) a portion of the virtual address is used to identify (by apparatus 303 in the address generation unit) a page table entry 304 in main memory unit 15. The page table entry 30th is transferred to the address generation unit 24 (or 28B), and test 305 tests selected fields in the page table entry to determine if the access being attempted with respect to the data element is permitted. When the access is not permitted, then an access violation 306 is identified and an appropriate operating system program is invoked to determine how to respond to the access violation. When the test 305 determines that the access to data element 312 is permitted, then a test 307 is performed on page table entry 304 to determine if the data element required for the instruction is available in the main memory unit 15. When the test 307 indicates that the data element is not present, then a page fault 308 is generated and an appropriate operating system program is invoked to transfer the data element to the main memory 15 (in location 312). If the required data element is available in the main memory unit as determined by test 307, test 309 tests the page table entry 304 to determine if the activity for which the data element is required by the associated instruction is designated as resulting in a fault. When the activity determined by the instruction is designated as a fault condition, then a fault on read, a fault on write, or a fault on execute will invoke an operating system program to respond to the fault condition. If the test 309 indicates that the activity of the instruction with respect to the associated data element is not designated as a fault condition, the address generation unit 24 (or 28B) determines the physical address 311 in the main memory unit 15 where the required data element is stored. The data element 312 at this address is transferred to a storage location 313 in the scalar registers 23, the vector operation registers 28C, or to the instruction cache memory unit 21 (i.e., when the data element is an instruction). In this manner, the required data element, identified by a virtual address, is available for processing by the instruction 301.

Figure 4A:
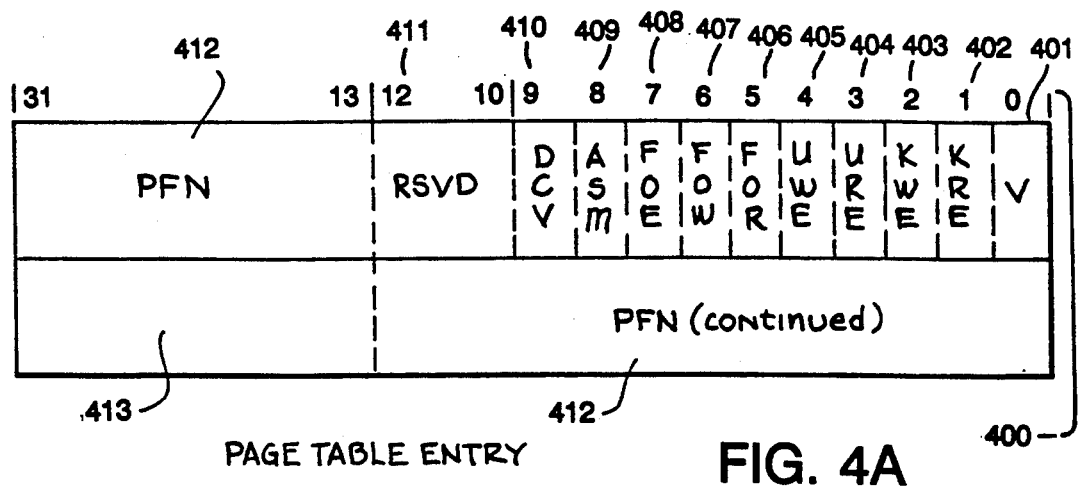
FIG. 4A is a page table entry format according to the preferred embodiment.

Referring to FIG. 4A, the page table entry 400 used to translate the virtual addresses to the physical addresses is shown. The field V (Valid) in the 0 bit position 401 indicates the validity of the DCV, ASM, FOE, FOW, FOR and PFN fields. When the valid bit is set, these fields are valid for use by the hardware apparatus. When this bit is clear, then the PFN (Page Frame Number) field is reserved for use by the operating system program. The field KRE (Kernel Read Enable) in the bit 1 position 402 enables reads when the central processing unit is in the privileged or kernel mode. When this bit is zero and a data read operation or an instruction fetch is attempted in kernel mode, an Access Violation exception occurs. The field KWE (Kernel Write Enable) in the bit 2 position 403 enables write operations when the central processing unit is in the privileged or kernel mode. When this bit is zero and a data write operation is attempted in kernel mode, a Access Violation exception occurs. The URE (User Read Enable) field in bit 3 position 404 enables read operations when the central processing unit is in a nonprivileged or user mode. When this field is zero and a data read operation or instruction fetch is attempted while the central processing unit is operating in the user mode, an Access Violation exception occurs. The UWE (User Write Enable) field in the bit 4 position 405 enables write operations from the nonprivileged or user mode. When this field is zero and a data write operation is attempted in the URE mode, an Access Violation exception occurs. The KRE, KWE, URE and UWE fields are valid even when the V field is zero. The FOR (Fault On Read) field in the bit 5 position 406, when set to logic one, results in a Fault on Read exception when an attempt is made to read any location (i.e., a LOAD instruction reading data from a location on the page) from the associated page. The FOW (Fault On Write) field in the bit 6 position, when set to a logic one, results in a Fault on Write exception when an attempt is made to perform a write operation (i.e., STORE instruction writing data to a location on the page) to any location in the associated page. The FOE (Fault On Execute) field in the bit 7 position, when set to a logic one, results in a Fault on Execute when an attempt is made to execute an instruction from the associated page. The ASM (Address Space Match) field in the bit 8 position signifies that all Address Space Numbers (ASNs) match in attempted accesses to the associated page (i.e. ASN is not used in the translation buffer by the comparators). The DCV (Don't Cache Virtual) field in the bit 9 position 410, when set to a logic one, prohibits the contents of the associated page from being stored in a virtual cache. The field in the bit 10–12 positions 411 is reserved for future use. The PFN (Page Frame Number) field in bit 13–44 positions contain the page frame number. The PFN field always points to a physical page frame boundary. When the V field 401 is set, the Byte within Page (i.e., displacement) bits from the virtual address are concatenated with the PFN field to form the physical address used by the hardware apparatus.

Figure 4B:
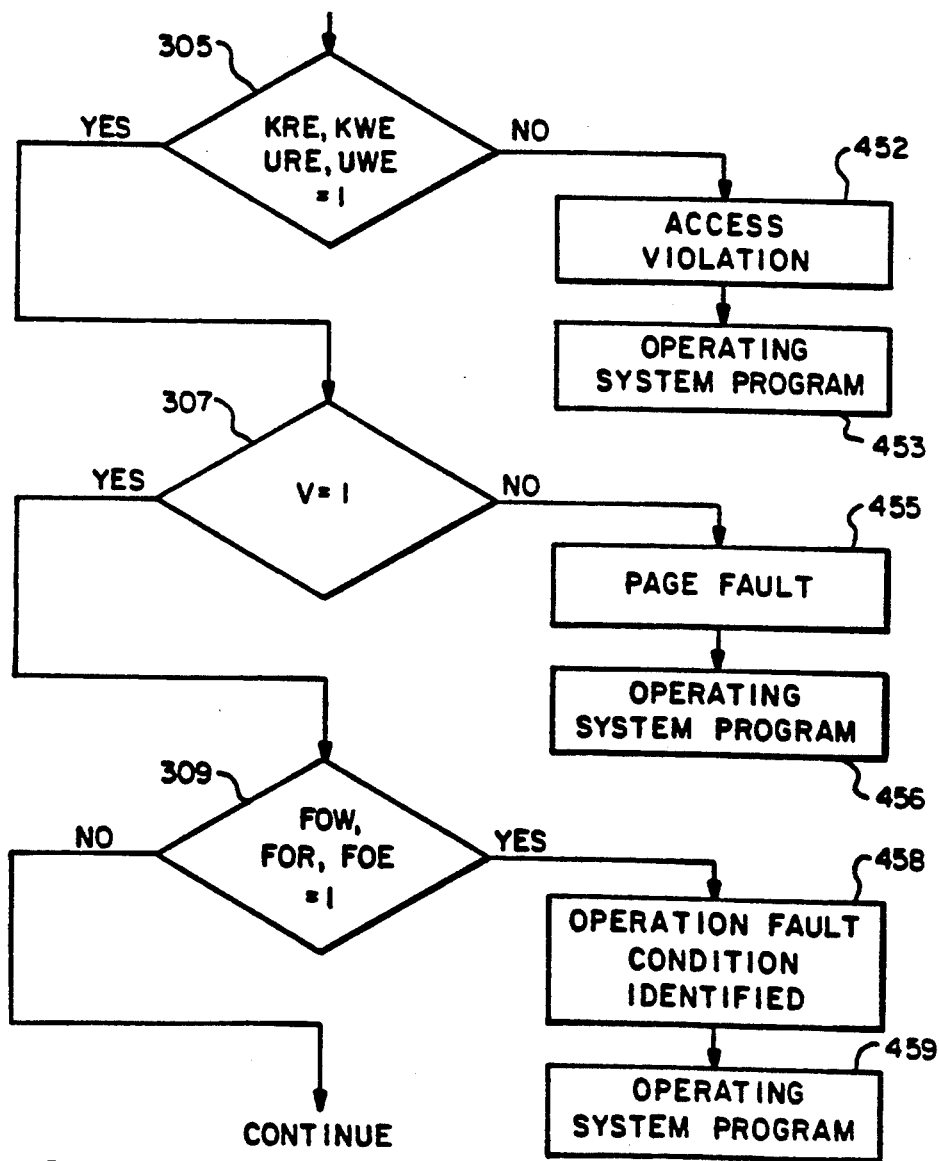
FIG. 4B illustrates the testing of the page table entry fields to determine if access to associated page table is permitted.

Referring next to FIG. 4B, the testing of the page table entry fields, shown generally in FIG. 3 as tests 305, 307 and 309, are illustrated in terms of page table entry fields identified in FIG. 4A. In test 305, the access rights associated with the page table entry is compared with the access parameters of the instruction attempting to access a data element within the page to determine whether the intended access is allowed. In particular, the KRE, the KWE, the URE and the UWE fields (i.e., fields 402 through 405) are compared with the mode of operation of the data processing system and with the access activity (i.e., a read or a write operation) to determine if the access is permitted. When the access is not permitted, an access violation 452 is identified and an appropriate operating system program 453 is invoked. In test 307, the validity bit V (i.e., field 401) is tested to determine if valid data is stored in the page of data and/or instructions associated with the virtual address. When valid data is not associated with the page of data elements, then a page fault 455 is identified and an appropriate operating system program 456 is invoked. The appropriate operating system response in this situation is to move the page of data elements to the main memory unit from the backing store and to re-execute the instruction that incurred the page fault. With respect to test 309 of FIG. 3, the page table fields FOR (Fault on Read), FOW (Fault on Write) and FOE (Fault on Execute), i.e., fields 406 through 408, are tested against parameters of the associated instruction to determine if the attempt to perform the instruction operation on a data element of the page of data elements should result in a fault condition. If a fault condition is identified 458, an operating system program 457 is invoked. Otherwise, the physical address is generated.

Figure 5:
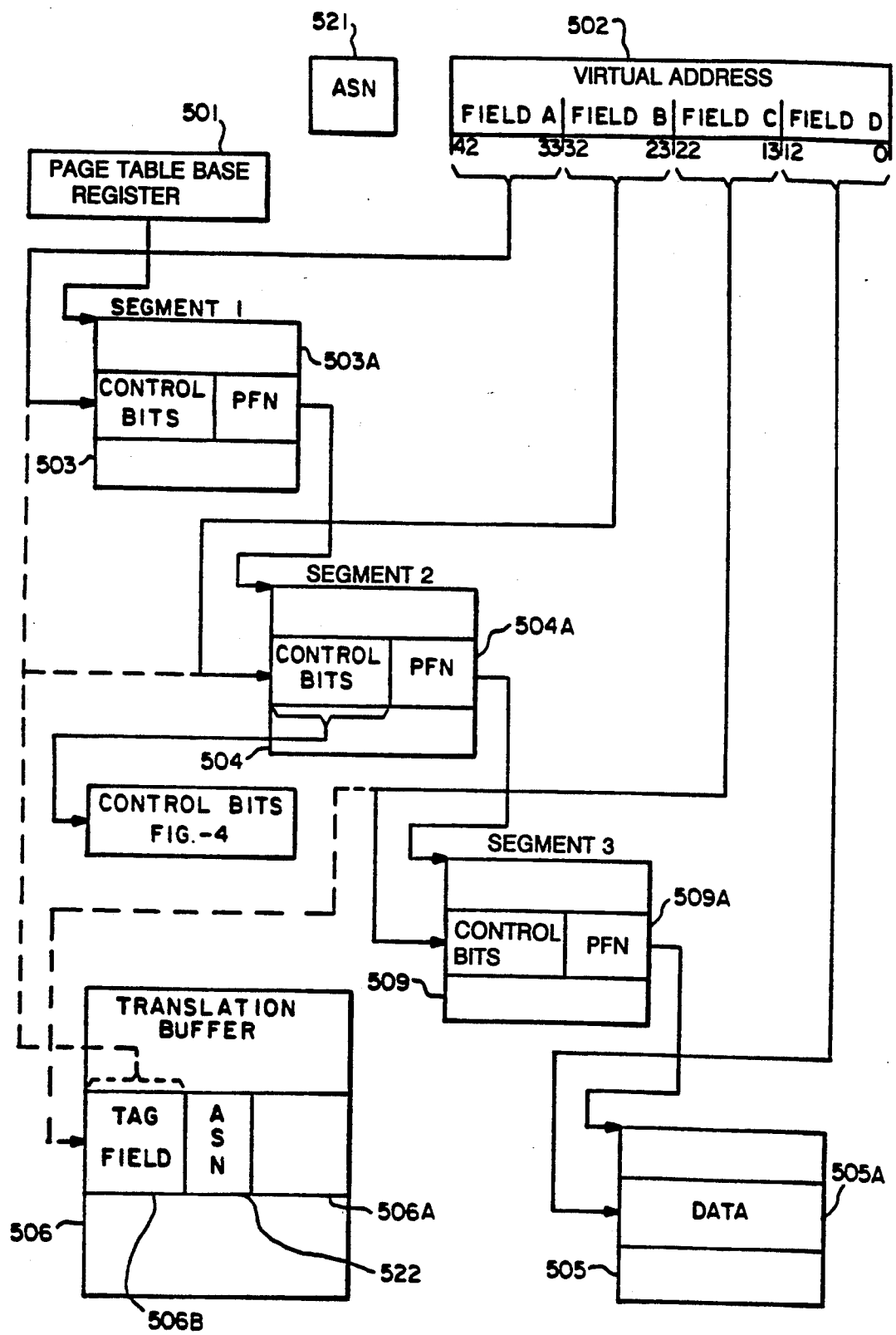
FIG. 5 illustrates the indirect addressing technique utilizing the present invention.

Referring next to FIG. 5, the indirect address translation technique with which the present invention is utilized, is illustrated. The determination of a physical address is performed in the scalar operation address generation unit 24 or in the vector operation address generation unit 28B of FIG. 2. The contents of the page table base register 501 and the address space number register 521 are stored in the scalar operation address generation unit 24 and in the vector operation address generator unit 28B of FIG. 2. To obtain a data element (i.e., data element 505A) corresponding to a virtual address, the virtual address of the data is entered into the scalar operation address generation unit 24 or the vector operation address generation unit 28B of FIG. 2. The contents of page table base address register 501 are interpreted as a starting location in a set of data groups segment 1, 503, and the highest order 10 bits (Field A) of the virtual address 502 are interpreted as an index in the segment 1, 503. The data group 503A is identified by this operation and this data group (503A) is transferred to the scalar operation address generation unit 24 or the vector operation address generation unit 28B of FIG. 2. The PFN (Page Frame Number) portion of data group 503A is used as the base address of the set of data groups labelled as segment 2, 504. Field B (i.e., the next 10 bits of the virtual address 502) is used as the index value for segment 2 to obtain the data element 504A of segment 2, 504. The data group 504A is transferred to scalar address generation unit 24 or the vector operation address generation unit 28B of FIG. 2. Included in the data group 504A are the access control bits that are described with reference to FIG. 4. These access control bits are checked at this time and, where appropriate, a designated exception is generated. (In the preferred embodiment, the access control bits associated with segment 1 and segment 2 are also tested, but only for kernel read access). In addition, the V field may be checked at the segment 1 or segment 2 level to determine if the page table page at the segment 2 or segment 3 level is resident in main memory.) The PFN portion of data element 504A is used to determine the base address of segment 3, 509. Field C (i.e., the next 10 bits of the virtual address) is used as the index value of segment 3, along with the base address of the PFN field 504A of segment 2, to obtain the address of the data group 509A. Finally, the PFN of the data group 509A references the base address of the data page 505. The least significant 13 bits of virtual address 502 (Field D) determine an offset in the data page 505 and identify data group 505A, the data group identified by the virtual address. To eliminate two stages of memory reference in the foregoing procedure, a translation buffer 506 can be provided in scalar operation address generation unit 24 and/or the vector operation address generation unit of FIG. 2. According to one embodiment, the Field C (10 bits) of the virtual address can be used to identify a location in the translation buffer. A tag field of the addressed location is compared with the 20 bit Field A and Field B of the virtual address 502 to establish the correctness of the identification. The data group 504 A is stored in the translation buffer and can be used by the scalar or vector operation address generation unit. An address translation buffer can be implemented in other ways to expedite address translation. In addition to the 20 Field A and Field B bits, the translation buffer tag field has associated therewith an Address Space Number (ASN) 522. If the ASM bit from the data group 504A is set to 1, then a match between the 20 Field A and Field B bits from the virtual address with the 20 Field A and Field B tag bits is sufficient to identify a correct translation. If, however, the ASM bit from the data group 504A is zero, then not only do the 20 Field A and Field B bits from the virtual address have to match the 20 bit tag field, but also the current ASN 521 must match the field 522 from the translation buffer.

2. Operation of the Preferred Embodiment

The central processing unit having pipelined execution units of FIG. 2 was implemented in the preferred embodiment subject to several constraints; however, other design implementations can utilize the present invention. The central processing unit includes a plurality of execution units, each adapted to execute a class of instructions. By way of example, one execution unit, the scalar address generating unit 24, controls the transfer of the data elements between the central processing unit and the main memory unit, i.e., executes the scalar load/store instructions. One execution unit is adapted to execute data shifting operations, one execution unit for floating point add/subtract operations, one execution unit is adapted for integer and floating point multiply operations, and one execution unit is adapted for integer and floating point divide operations. The specialized execution units can be, but are not necessarily implemented in a pipelined configuration. The other features of the central processing unit are the following. The instruction in the currently executing sequence of instructions is transferred to the issue unit 22 from the instruction cache memory unit 21. In the issue unit, the instruction is broken down into its constituent parts and data-dependent control signals and address signals are generated therefrom. However, before an instruction can begin execution (i.e., be issued), several constraints must be satisfied. All source and destination registers for the instruction must be available, i.e., no write operations to a needed register can be outstanding. The register write path must be available at the future cycle in which this instruction will store the processed quantity. The execution unit to be required for processing the instruction during the execution must be available to perform the operation. With respect to the vector operation unit, a vector operation reserves an execution unit for the duration of the vector operation. When a memory load/store instruction experiences a cache memory unit miss, the load/store unit busy flag will cause the subsequent load/store instructions to be delayed until the cache memory miss response is complete. When an instruction does issue, the destination register and the write path cycle for the result are reserved. During operand set-up, all instruction-independent register addresses are generated, operands are read and stored, and data-dependent control signals are generated. The instruction operands and control signals are passed to the associated execution unit for execution. The result generated by the execution unit is stored in the register files or in the data cache memory unit 15 as appropriate. Once an instruction issues, the result of the processing may not be available for several machine cycles. Meanwhile, in the next machine cycle, the next instruction can be decoded and can be issued when the requisite issue conditions are satisfied. Thus, the instructions are decoded and issued in the normal instruction sequence, but the results can be stored in a different order because of the of the varying instruction execution times of the execution units. This out of order storing complicates the exception handling and the retry of failing instructions. However, these events are relatively rare, and the out of order storing provides execution and hardware advantages.

With respect to FIG. 3, the use of virtual addressing techniques has been widely implemented. This technique permits the programmer to be unconcerned with actual location of the data and instruction elements, the address generation mechanism providing an interface between the program addresses and the data and instruction elements within the data processing unit. By the use of pages of data and instruction elements, the transfer of data and instruction elements from the bulk or mass store media is expedited, there being no need to transfer individual data and instruction elements. In addition, programs are generally written in a format that stores data and instruction elements needed for sequential instruction execution relatively close together in the program or file. Thus, a page of data and instruction elements will typically include a multiplicity of related data and instruction elements for program execution. None-the-less, the relative rigidity of the granularity of the page implementation has the result, particularly in the vector instruction execution, that the group of related data and instruction elements can extend beyond the page boundary to a page not present in the main memory unit of the data processing system. In the preferred embodiment, the address generation mechanism 24 includes apparatus portions for address translation and for generating an exception (i.e., test 307) when the required page of information is not in the main memory unit 15 and includes a software program portion as part of the operating system for transferring pages of information between the bulk storage apparatus and the main memory unit. The address generation mechanism 24, when a page of data and instruction elements is transferred into the main memory unit 15, provides associated page table entries in main memory 15 wherein the currently executing program can identify all the pages of data and instruction elements (associated with virtual addresses) stored in the main memory unit 15 and can therefore signal a page fault when the referenced data or instruction element is not in main memory unit 15. As shown in FIG. 3, the data processing unit typically includes procedures associated with the virtual addressing technique such as the apparatus for signaling that the required information page is not in the main memory unit, as well as the programs for responding to a page fault by retrieving the missing page of information.

The operating system changes the page table entries as part of the memory management function. The operating system can set or clear the valid bit, change the page frame number field as the pages are moved to and from external storage media or modify the software bits.

The present invention is directed to validating that a particular type of access is permitted to a specific set of information from a particular access mode. Access to each set of information (i.e., page) is controlled by a protection code that specifies, for each access mode (kernel or user), whether read or write references are allowed. The central processing unit has available the following information to control an attempted access. The virtual address used to index page tables, the intended access type (i.e., read data, write data or instruction fetch) and the current access mode (from the Processor Status register) are available to define the status of the central processing unit. When the access to the page table is permitted (i.e., the page table entry is consistent with the intended access type central processing unit status), then a virtual address can be made to correspond to a physical address.

In the preferred embodiment, every page in the virtual address space is protected according to its use. A program can therefore be prevented from reading from or writing into portions of its address space. Associated with each page is a protection code that describes the accessibility for each mode of operation of the data processing system. The code implementation permits a choice of read or write protection for each mode of the central processing unit. Each processing unit mode can be read/write, read-only or no access. The read and write accessibility are specified independently. The protection mode of each mode can be specified independently. A page can be designated as execute only by setting the read enable bit for the access mode and by setting the fault on read and the fault on write fields in the page table entry. The fault on execute mode along with the appropriate access signals can prevent the data processing system from attempting to execute data elements.

Specifically, the scalar and vector operation address generation units have available information describing the particular operation for which the data group is being requested. With information regarding the accessibility of the data group as well as the operation for which the data group was intended, the following protections are available:

1. Access Protection (UWE, URE, KWE, KRE)
2. Modified Data (UWE, KWE, FOW. An attempted write results in the appropriate operating system program, which sets a software defined modify bit, being entered.)
3. Copy or Modify (UWE, KWE, FOW. An attempted write results in operating system program being entered which copies the page.)
4. Read Only (URE, KRE, FOW, FOE)
5. Write Only (UWE, KWE, FOR, FOE)
6. Execute Only (URE, KRE, FOR, FOW)
7. Protected Entry to Operating System (URE, KRE, FOR, FOE)

The ASM (Address Space Match) field provides a bit, that, when set, permits the selected address in the translation buffer to be used when the translation buffer location tag field is consistent with the virtual address. When the ASM field is not set, then an additional field, the ASN field associated with both the translation buffer location and the virtual address must be identical.

In some applications it can be useful to associate an address in cache memory with the virtual address rather than with the physical address. In certain situations, the use of virtual addresses by the cache memory unit can lead to erroneous data group identifications (a physical address with more than one virtual address mappings). The DCV bit position determines whether data associated with a virtual address is allowed to be associated with the cache memory using virtual addressing.

The foregoing description is included to illustrate the operation of the preferred embodiment and is not meant to limit the scope of the invention. The scope of the invention is to be limited only by the following claims.

From the foregoing description, many variations will be apparent to those skilled in the art that would yet be encompassed by the spirit and scope of the invention.

What is claimed is:

1. Apparatus for controlling access to and use of stored elements by a processor that requests said access by identifying one of said stored elements and indicating an indicated use for said one stored element from a set of uses, said apparatus comprising:

a memory that includes a plurality of regions each of which stores multiple said stored elements, storage for a plurality of records each of which corresponds to one region of said plurality of regions and includes access information that defines uses in said set of uses for which said processor is permitted to access said one region and use information stored separately from said access information, said use information designating one or more uses for the multiple stored elements stored in said one region from said set of uses, and a controller for responding to one of said requests by:
examining the access information in a corresponding record for a particular region in which the stored element identified in the request is stored and selectively granting said processor access to said particular region if said access information indicates that said processor is permitted to access said particular region for said indicated use, and if said access is granted, then examining the use information is said corresponding record and regulating use of said element by said processor based on said use information and said indicated use.

2. The apparatus of claim 1 wherein said processor selectively operates in a user mode or a kernel mode, said access information defining the uses in said set of uses for which said processor is permitted to access said region which corresponds to said record for each one of said user and kernel modes, said controller selectively granting said access to said stored elements according to the one of said user and kernel modes in which the processor is operating and said access information for said one mode.

3. The apparatus of claim 1 wherein said stored elements include instruction elements and a use from said set of uses is execution, said controller responding to one of said requests that identifies an instruction element as said one stored element by using said use information to prevent said processor from using said instruction element unless said indicated use is execution.

4. The apparatus of claim 1 wherein said processor includes a cache memory unit, said apparatus further comprising an address controller responsive to address information in each one of said records for addressing elements in said cache memory unit.

5. The apparatus of claim 1 wherein said processor generates a plurality of virtual addresses for said stored elements and a first address space number associated with each of said virtual addresses, said apparatus further comprising:

a translation buffer for translating said virtual addresses to physical addresses, said translation buffer having a second address space number corresponding to each virtual address to be translated; and a comparator which compares, for each virtual address to be translated by said translation buffer, said first address space number corresponding to said virtual address with the corresponding said second address space number in response to address space number information in said record, said translation buffer being utilized to translate a virtual address only if said comparator determines that corresponding first and second address space numbers are identical.

6. The apparatus of claim 1 wherein said record includes information that identifies whether the stored elements in the region corresponding to said record may be stored in a virtual cache.

7. The apparatus of claim 1 wherein said controller includes means for informing an operating system if one of said requests indicates a selected one or more of said set of uses designated by the use information in the record that corresponds to the region in which the stored element identified in the request is stored.

8. The apparatus of claim 1 wherein said processor has a user mode of operation for executing nonprivileged instructions and a kernel mode of operation for executing nonprivileged and privileged instructions and said set of uses includes read and write, said access information comprising:

a first field position enabling read access for said user mode;

a second field position enabling write access for said user mode;

a third field position enabling read access for said kernel mode; and a fourth field position enabling write access for said kernel mode.

9. The apparatus of claim 1 wherein said use information for each one of said regions is included in a use field in said record that corresponds to said region, said use field comprising:

a first field position for indicating a fault if said processor requests a write operation;

a second field position for indicating a fault if said processor requests a read operation; and a third field position for indicating a fault if said processor requests an execute operation.

10. The apparatus of claim 1 where each said record includes validity information that indicates whether elements stored in the region in said memory that corresponds to said record are valid.

11. The apparatus of claim 1 where said processor has a plurality of operating modes, said access information defining, for each of said plurality of operating modes, whether said processor is permitted access to said particular region, said controller being adapted to deny said request and generate an access violation unless a current operating mode of said processor is one which said access information defines as a mode for which access to said particular region is permitted.

12. The apparatus of claim 11 wherein said controller is adapted to deny said request regardless of the indicated use unless said current operating mode of said processor is one which said access information defines as a mode for which access to said particular region is permitted.

13. The apparatus of claim 1 where said use information can designate no, some, or all uses from said set of uses, said controller including means for invoking an exception routine if said indicated use is not designated by said use information.

14. The apparatus of claim 13 wherein said exception routine causes said processor to be denied said indicated use.

15. The apparatus of claim 13 wherein said exception routine allows said processor to perform said indicated use but causes an operating system to be informed that said indicated use is being performed.

16. The apparatus of claim 1 where said stored elements comprise different types of stored elements and said use information designates said one or more uses based on said element types, said controller regulating use of said stored element identified in said request by selectively granting or denying said indicated use based on the element type of said stored element identified in said request and said use information.

17. The apparatus of claim 16 where said element types include data elements and instruction elements, said controller being adapted to deny said indicated use if the stored element identified in the request is an instruction element unless the indicated use is execution.

18. The apparatus of claim 1 wherein said plurality of regions comprise pages of a virtual memory.

19. The apparatus of claim 18 wherein each one of said records comprises a page table entry for page to which said record corresponds, said access information and said use information being included in fields of said page table entry.

20. A method for controlling access to and use of stored elements by a processor of a kind that requests said access by identifying one of said stored elements and indicating an indicated use for said one stored element from a set of uses, said method comprising:

providing a memory that includes a plurality of regions each of which stores multiple said stored elements, storing a plurality of records each of which corresponds to one region of said plurality of regions and includes access information that defines uses in said set of uses for which said processor is permitted to access said one region and use information stored separately from said access information, said use information designating one or more uses in said set of uses for the stored elements from said one region, and responding to one of said requests by:

examining the access information in a corresponding record for a particular region in which the stored element identified in the request is stored and selectively granting said processor access to said particular region if said access information indicates that said processor is permitted to access said particular region for said indicated use, and if said processor is granted access, then examining the use information in said corresponding record and regulating use of said stored element by said processor based on said use information and said indicated use.

* * * * *